United States Patent [19]
Dick

[11] Patent Number: 5,217,416
[45] Date of Patent: Jun. 8, 1993

[54] LOCK UP/LIMITED SLIP DIFFERENTIAL

[75] Inventor: Joseph A. Dick, Fort Wayne, Ind.

[73] Assignee: Dana Corporation, Toledo, Ohio

[21] Appl. No.: 870,282

[22] Filed: Apr. 17, 1992

[51] Int. Cl.[5] .............................................. F16H 1/44
[52] U.S. Cl. ..................................... 475/150; 475/249
[58] Field of Search .................................. 475/150, 249

[56] References Cited

U.S. PATENT DOCUMENTS

| | | | |
|---|---|---|---|
| 2,420,553 | 5/1947 | Morrill | 475/154 |
| 2,429,702 | 10/1947 | Thompson | 475/154 |
| 2,803,150 | 8/1957 | Fisher | 475/150 |
| 3,138,232 | 6/1964 | Gerber et al. | 192/48.2 |
| 3,215,234 | 11/1965 | Hirano | 192/48.2 |
| 4,718,303 | 1/1988 | Fogelberg | 475/150 |
| 4,781,078 | 11/1988 | Blessing et al. | 475/150 |
| 4,805,486 | 2/1989 | Hagiwara et al. | 475/150 |
| 4,838,118 | 6/1989 | Binkley | 475/150 |
| 4,895,051 | 1/1990 | Weiss et al. | 475/150 |
| 5,007,885 | 4/1991 | Yamamoto et al. | 475/231 |
| 5,019,021 | 5/1991 | Janson | 475/150 |
| 5,156,578 | 10/1992 | Hirota | 475/150 |

*Primary Examiner*—Dirk Wright
*Attorney, Agent, or Firm*—Marshall & Melhorn

[57] ABSTRACT

The present invention relates to a differential gear assembly including a rotatable case having an annular gear formed therein with first and second axle shafts journalled in the case for rotation relative thereto. A sun gear is connected to the first axle shaft for rotation therewith, and a planetary carrier is connected to the second axle shaft for rotation therewith. A plurality of pairs of planetary gears is supported on the carrier, with a first gear of each of the pairs meshing with the annular gear and a second of each of the pairs meshing with the sun gear. Clutch means are provided for limiting relative rotation between the first axle shaft and the second axle shaft by clutching the sun gear to the planetary carrier, the clutch means including a clutch pack formed of a plurality of annular clutch disks. The assembly also incorporates means for selectively compressing the clutch pack, including an actuator plate spaced by an air gap an effective distance from an electromagnet disposed between the actuator plate and the clutch pack. A pressure plate is disposed adjacent the clutch pack, the pressure plate being connected to the actuator plate by means of a plurality of legs. Upon actuation of the electromagnet, the actuator plate is drawn towards the electromagnet, moving the plurality of legs axially and urging the pressure plate against the clutch pack.

8 Claims, 1 Drawing Sheet

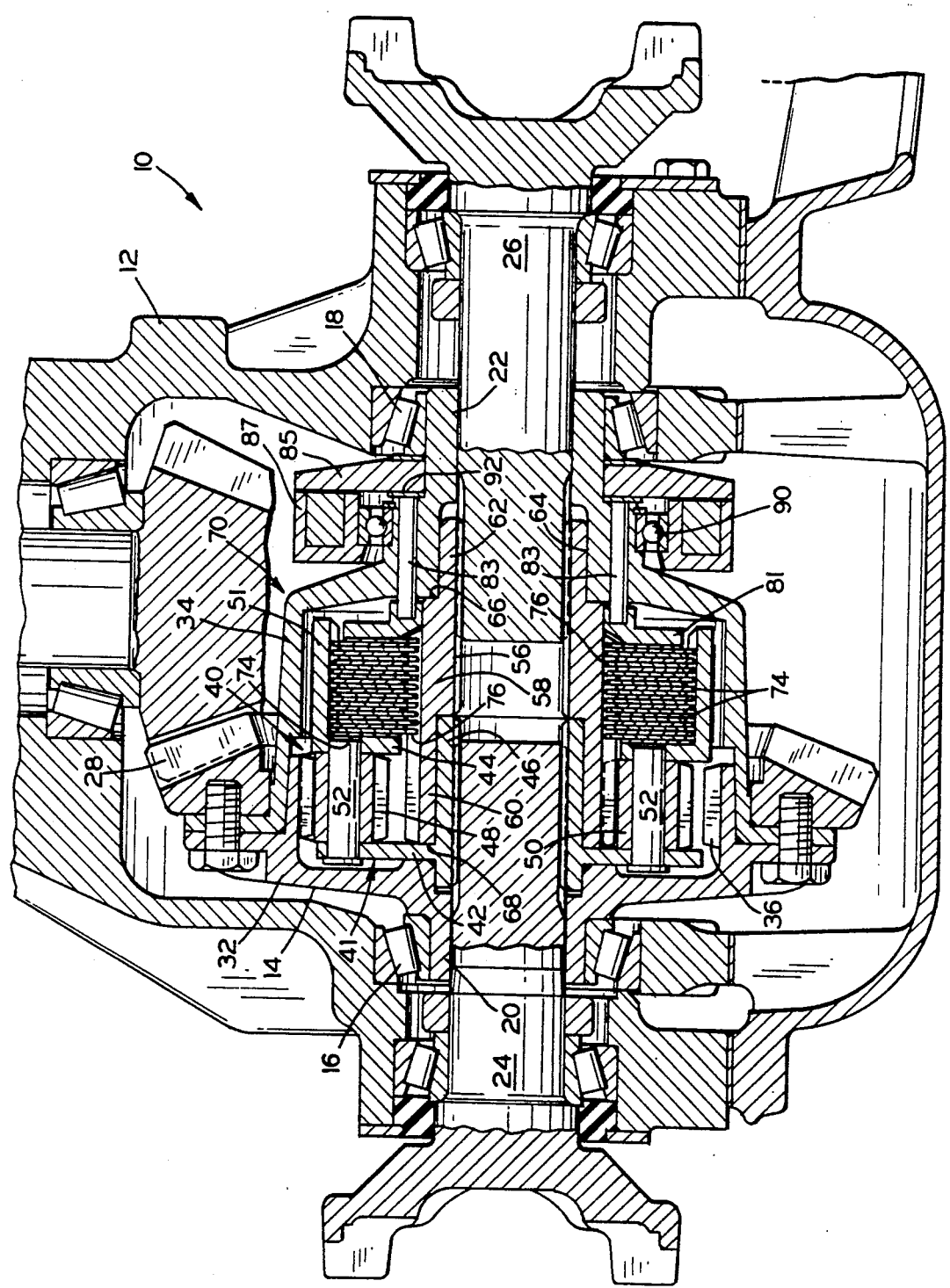

LOCK UP/LIMITED SLIP DIFFERENTIAL

BACKGROUND OF THE INVENTION

1. Field of the Invention

The invention relates to a lock up or limited slip differential mechanism for effectively transferring torque to both of a coaxially aligned pair of axles of a wheeled vehicle. More particularly, the invention relates to a compact differential of the type having a planetary gear assembly which includes an electromagnetically operated clutch mechanism that provides a resistance to excessive relative rotation of the axles of the vehicle.

2. Summary of Related Art

A conventional differential gear is arranged in a vehicle drive train to allow, at the time of turning, the outer wheel to rotate faster than the inner wheel while maintaining an equally divided torque distribution to the left and right wheels, thereby securing a smooth turn. The differential is disadvantageous in driving the vehicle under some conditions. For instance, if one wheel is on a low friction surface, such as ice, high torque cannot be transmitted to the other wheel due to the constitution of the differential. To avoid such a disadvantage, there is provided a differential lock up or limiting mechanism which effects a torque transfer to the wheel on the higher friction surface, thus increasing the total available tractive force for propelling the vehicle and thereby improving the mobility and performance thereof.

In applications where compactness is required, such locking and/or limited slip differentials may include a compound planetary gear assembly, including an annular gear, planetary carrier, planet gears and sun gear, disposed within the differential gear case. A clutch pack is typically disposed such that, when engaged, the sun gear is clutched to the gear case to retard, or even prevent, rotation between the gear case and the sun gear.

Additionally, some sort of actuating mechanism is provided to actuate or move the clutch pack from its disengaged position to an engaged position. Some differentials include an externally controllable clutch mechanism which may vary the amount of clutch force applied independently of the relative rotational speed of the axles. Such mechanisms have been incorporated in a planetary differential, including electromagnet actuation.

In some applications, however, even the current planetary gear type differentials are considered disadvantageously large due in part to the size of the clutch pack and magnet required to achieve the necessary torque transfer capability. The transfer of equal or greater torques is thus required from a more compact assembly than was heretofore possible.

SUMMARY OF THE INVENTION

The present invention relates to a differential gear assembly including a rotatable case having an annular gear formed therein with first and second axle shafts journalled in the case for rotation relative thereto. A sun gear is connected to the first axle shaft for rotation therewith, and a planetary carrier is connected to the second axle shaft for rotation therewith. A plurality of pairs of planetary gears are supported on the planetary carrier, with a first gear of each of the pairs meshing with the annular gear and a second of each of the pairs meshing with the sun gear. Clutch means is provided for limiting relative rotation between the first axle shaft and the second axle shaft by clutching the sun gear to the planetary carrier, the clutch means including a clutch pack formed of a plurality of annular clutch disks.

The assembly also incorporates means for selectively compressing the clutch pack including a pressure plate adjacent the clutch pack and an actuator plate spaced by an air gap an effective distance from an electromagnet disposed between the actuator plate and the pressure plate. The pressure plate is connected to the actuator plate by means of a plurality of legs. Upon actuation of the electromagnet, the actuator plate is drawn towards the electromagnet, moving the plurality of legs axially and urging the pressure plate against the clutch pack.

BRIEF DESCRIPTION OF THE DRAWING

The above, as well as other advantages of the present invention, will become readily apparent to those skilled in the art from the following detailed description of a preferred embodiment when considered in the light of the accompanying drawing, which is a sectional plan view of the invention taken along its centerline, except for the planetary gear assembly which is taken along a line intersecting the centers of an inner planet gear, the planetary carrier, and an outer planet gear.

DESCRIPTION OF THE PREFERRED EMBODIMENTS

Referring now to the drawing, there is illustrated a differential gear assembly 10 comprised of an outer housing 12 having a rotatable differential gear assembly case 14 disposed therein. The case 14 is mounted in a pair of coaxially disposed tapered roller bearings 16 and 18 by means of hub sections 20 and 22 extending from opposite ends of the case 14. The ends of a pair of coaxially aligned axle shafts 24 and 26 extend into the outer housing 12 and are journalled inside the hub sections 20 and 22, respectively. A pinion driven ring gear or crown 28 is affixed to the outer periphery of the case 14.

The differential gear assembly case 14 itself is formed of two axially separable members 32 and 34. The case member 32, on the left side of FIG. 1, is provided with a large diameter circumferentially disposed annular gear 36 having inwardly facing parallel teeth integrally connected to its inner surface.

A radially disposed compound planetary gear assembly 40 is mounted coaxially inside of the annular gear 36. The planetary gear assembly 40 includes a planetary carrier 41 formed of two parallel annular plates 42 and 44. The plate 42, shown on the left in FIG. 1, is integrally connected to a hub section 46, which is in turn connected to the end of the axle shaft 24 by means of internal splines. A circular center portion of the plate 44, shown on the right in FIG. 1, is cut out to provide an annular opening between the plate 44 and the hub section 46. The plate 44 is further provided with an integral, internally splined sleeve 51 extending generally perpendicularly from the plate 44 away from the plate 42.

Meshed pairs of planet gears, inner planet gear 48 and outer planet gear 50, are rotatably mounted on parallel pins 52 in the space between the plates 42 and 44. The plates 42 and 44 are joined together by means of radially disposed web members 54 interposed between the pairs of planet gears 48 and 50. The thickness of the web members 54 increases in a radially inward direction.

One of each meshed pair of planet gears, namely outer gear 48, is disposed closer to the periphery of the plates 42 and 44 than the other, so that gear 48 meshes with annular gear 36. The other, inner planet gear 50, is meshed with a sun gear 56 which is provided with a gear section extending into the space between plates 42 and 44 through the annular opening in the plate 44. The planetary carrier 41 and sun gear 56 are thereby made to rotate in the same direction.

The sun gear 56 has a generally cylindrical midsection 58 which lies between an integrally connected left end section 60 and an integrally connected right end section 62. The right end section 62 of the sun gear 56 extends between the end of the axle shaft 26 and a concentric bearing surface 64 recessed in the end of the case member 34, and is connected to the end of the axle shaft 26 by means of internal splines. The peripheries of the adjoining midsection 58 and right end section 62 are offset, forming a radially disposed annular shoulder 66 at the junction therebetween. The shoulder 66 bears against an associated annular shoulder formed within the case member 34. The left end section 60 of the sun gear 56 is journalled on the hub section 46 of the planetary gear assembly 40, and is thus free to rotate thereabout. The left end section 60 terminates in a radially disposed face 68 which bears against the inner wall of left plate 42. The gear teeth on the outside of the sun gear 56 extend from its left end section 60 to the right end of its midsection 58.

An electromagnetically operated clutch assembly 70 is incorporated in the differential to provide a variably controllable resistance to the relative rotation of the coaxially aligned axle shafts 24 and 26. Clutch assembly 70 includes a clutch pack comprised of a plurality of laterally movable annular clutch disks concentrically stacked together side by side. Alternate disks 74 and intermediate disks 76 of the clutch pack are linked respectively by one or more components to the left and right axle shafts 24 and 26, respectively. The following linkage or torque path is provided between the plurality of alternate clutch disks 74 and axle shaft 24: the plurality of alternate disks 74 are slidably keyed by means of outwardly extending splines to the internal splines on the sleeve 51 of the planetary carrier 41; and, as noted above, the hub section 46 of the planetary carrier 41 is splined to the left axle shaft 24. A linkage or torque path is also provided between the plurality of intermediate clutch disks 76 and axle shaft 26: the intermediate clutch disks 76 are slidably keyed by means of radially inwardly projecting teeth to the teeth surrounding the right end portion of the midsection 58 of the sun gear 56; and the sun gear 56 is splined to the right axle shaft 26.

It will be appreciated that by clutching the sun gear 56 to the planetary carrier 41 through the integral sleeve 51, rather than clutching the sun gear 56 to the case 14, the total torque transferred is effectively increased by a factor equal to the ratio of the number of teeth in the annular gear 36 with the number of external teeth on the sun gear 56. This is because only a portion of the effective amount of torque transferred travels through the clutch pack. Thus, if for instance the left axle shaft 24 experiences a frictionless condition, the clutch will be actuated to transfer torque to the right axle shaft 26. The torque will travel from the annular gear 36 to the planet gears 48 and 50. A portion then travels from the inner planet gear 50 to the sun gear 56 and then to the right axle shaft 26. The remainder of the total torque transferred travels from the planet gears 48 and 50 through the pins 52 to the planetary carrier 41, to the intermediate clutch disks 76 splined to the sleeve 51 of the planetary carrier 41, to the alternate clutch disks 74 splined to the sun gear 56, and finally from the sun gear 56 to the right axle shaft 26.

As an example, the annular ring 36 shown in the drawing is twice as large as the sun gear 56, so only one half of the total torque transferred travels directly through the clutch pack. Therefore, twice the torque may be transferred as compared with an assembly having an identical clutch pack and magnet, but clutching the sun gear 56 to the case 14. Alternatively, the clutch pack and/or magnet may be made smaller while maintaining the same capacity for total torque transfer.

In order to effect actuation of the clutch pack in its position between the sleeve 41 and sun gear 56 as described above, an axially moveable, radially disposed annular pressure plate 81 is used to apply a lateral force against an adjacent end face of the clutch pack. The clutch pack is thereby sandwiched between the pressure plate 81 and the outer annular surface of the plate 44 of the planetary carrier 41. A plurality of parallel legs 83 are integrally attached to the pressure plate 81, extending generally perpendicularly from the surface of the pressure plate 81 and away from the clutch pack. The legs 83 extend through apertures in the side wall of right side case member 34. An annular steel actuator plate 85 is connected by threaded fasteners to the protruding ends of the legs 83, and is thereby linked to the pressure plate 81. The pressure plate 81 and actuator plate 85 are preferably linked by at least four parallel, circumferentially evenly spaced legs 83.

An annular electromagnet 87 is rotatably mounted by means of bearing 90 to the right side case member 34 in a position inside of the differential housing 12 and between the actuator plate 85 and the pressure plate 81. The electromagnet 87 and actuator plate 85 are positioned an effective distance from each other so that when the electromagnet is energized the actuator plate 85 will be drawn towards the electromagnet 87, thereby moving the plurality of legs 83 axially in the same direction and urging the pressure plate 81 against the adjacent end face of the clutch pack. Shims 92 may be utilized to obtain the desired gap between the electromagnet 87 and actuator plate 85. This reaction compresses the clutch pack and increases the resistance to relative rotation between adjoining clutch disks 74 and 76, and likewise between the components keyed to them. Activation of the electromagnet and regulation of the intensity of the magnetic field occur preferably by means of electronic controls or alternatively as a result of driver intervention.

In accordance with the provisions of the patent statutes, the present invention has been described in what is considered to represent its preferred embodiment. However, it should be noted that the invention can be practiced otherwise than as specifically illustrated and described without departing from its spirit or scope. For example, even though spur gears are illustrated in the drawings, gears having other teeth configurations, such as helical gears, can be used.

What is claimed is:

1. A differential gear assembly comprising:
   a rotatable case having an annular gear therein;

first and second axle shafts journalled in said case for rotation relative thereto;

a sun gear connected to said first axle shaft for rotation therewith;

a planetary carrier connected to said second axle shaft for rotation therewith;

a plurality of pairs of planetary gears supported on said carrier, a first gear of each of said pairs meshing with said annular gear and a second of each of said pairs meshing with said sun gear;

clutch means for limiting relative rotation between said first axle shaft and said second axle shaft by clutching said sun gear to said planetary carrier, said clutch means including a clutch pack formed of a plurality of annular clutch disks; and means for selectively compressing said clutch pack including a pressure plate adjacent said clutch pack, an actuator plate spaced by an air gap an effective distance from an electromagnet disposed between said actuator plate and said pressure plate, and means for interconnecting said pressure plate and said actuator plate, whereby upon actuation of said electromagnet said actuator is drawn towards said electromagnet, urging said pressure plate against said clutch pack.

2. A differential gear assembly as defined in claim 1, wherein said means for interconnecting comprises a plurality of legs.

3. A differential gear assembly as defined in claim 1, wherein said clutch pack is comprised of a first plurality of annular clutch disks connected to said sun gear for therewith and a second plurality of annular clutch disks connected to said planetary carrier for relative rotation therewith.

4. A differential gear assembly as defined in claim 3, wherein said planetary carrier is comprised of first and second coaxially spaced plates having said planetary gears supported therebetween, a hub section connected to said second axle shaft, and a splined sleeve extending generally perpendicularly from said second plate away from said first plate, said sleeve being connected to said second plurality of annular clutch disks for rotation therewith.

5. A differential gear assembly as defined in claim 1, wherein said electromagnet is an annular electromagnet mounted on said case by means of bearings for rotation relative thereto.

6. A differential gear assembly as defined in claim 5, wherein said actuator plate is comprised of an annular plate mounted on said case coaxially to said electromagnet.

7. A differential gear assembly as defined in claim 6, wherein said pressure plate is connected to said actuator plate by means of a plurality of circumferentially evenly spaced legs extending through apertures in said case.

8. A differential gear assembly comprising:

a rotatable case having an annular gear therein;

first and second axle shafts journalled in said case for rotation relative thereto;

a sun gear connected to said first axle shaft for rotation therewith;

a planetary carrier connected to said second axle shaft for rotation therewith, said planetary carrier including first and second coaxially spaced plates, a hub section connected to said second axle shaft, and a splined sleeve extending generally perpendicularly from said second plate away from said first plate;

a plurality of pairs of planetary gears supported on said carrier, a first gear of each of said pairs meshing with said annular gear and a second of each of said pairs meshing with said sun gear;

clutch means for limiting relative rotation between said first axle shaft and said second axle shaft by clutching said sun gear to said planetary carrier, said clutch means including a first plurality of annular clutch disks connected to said sun gear for therewith and a second plurality of annular clutch disks connected to the sleeve of said planetary carrier for relative rotation therewith; and means for selectively compressing said clutch pack including a pressure plate adjacent said clutch pack and an actuator plate spaced by an air gap an effective distance from an annular electromagnet mounted on said case and disposed between said actuator plate and said pressure plate, said pressure plate being connected to said actuator plate by means of a plurality of circumferentially evenly spaced legs extending through apertures in said case, whereby upon actuation of said electromagnet said actuator is drawn towards said electromagnet, moving said plurality of legs axially and urging said pressure plate against said clutch pack.

* * * * *